(12) United States Patent
Baldemair

(10) Patent No.: US 8,837,615 B2
(45) Date of Patent: Sep. 16, 2014

(54) METHOD AND ARRANGEMENT FOR SELF INTERFERENCE CANCELLATION

(75) Inventor: Robert Baldemair, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/505,700

(22) PCT Filed: Nov. 2, 2009

(86) PCT No.: PCT/IB2009/007285
§ 371 (c)(1),
(2), (4) Date: May 2, 2012

(87) PCT Pub. No.: WO2011/051746
PCT Pub. Date: May 5, 2011

(65) Prior Publication Data
US 2012/0224610 A1  Sep. 6, 2012

(51) Int. Cl.
*H04K 1/10* (2006.01)
*H04L 27/28* (2006.01)
*H04L 25/03* (2006.01)
*H04B 7/155* (2006.01)
*H04L 27/26* (2006.01)

(52) U.S. Cl.
CPC ...... *H04L 25/03146* (2013.01); *H04B 7/15585* (2013.01); *H04L 27/2647* (2013.01); *H04L 25/03159* (2013.01)
USPC ............................. 375/260; 375/211; 375/259

(58) Field of Classification Search
USPC .......................................... 375/260, 211, 259
See application file for complete search history.

(56) References Cited

U.S. PATENT DOCUMENTS

| 6,563,864 B1 * | 5/2003 | Ibrahim et al. ................ 375/222 |
| 8,155,140 B1 * | 4/2012 | Husted .......................... 370/445 |
| 2002/0039383 A1 | 4/2002 | Zhu et al. |
| 2007/0211786 A1 * | 9/2007 | Shattil ........................... 375/141 |
| 2008/0205906 A1 * | 8/2008 | Murata ......................... 398/208 |
| 2010/0279602 A1 * | 11/2010 | Larsson et al. .................... 455/7 |

FOREIGN PATENT DOCUMENTS

| EP | 1 538 762 A2 | 6/2005 |
| WO | WO 2008/004916 A1 | 1/2008 |

OTHER PUBLICATIONS

Everett, et al: "Self-Interference Cancellation in Multi-Hop Full-Duplex Networks via Structured Signaling". Forty-Ninth Annual Allerton Conference. Allerton House, UIUC. Sep. 28-30, 2011. Illinois, USA.

* cited by examiner

*Primary Examiner* — Chieh M Fan
*Assistant Examiner* — Brian J Stevens

(57) ABSTRACT

The present invention relates to a method and arrangement for receiving an OFDM signal and forwarding the received OFDM signal comprising OFDM symbols of a wireless OFDM communication network. The wireless OFDM communication network includes self-interference cancelling functionality and each received OFDM symbol to be forwarded is prefixed with a cyclic prefix (CP) which is a copy of the last part of the OFDM symbol. In the method a delay for delaying an interference generating feedback signal is determined such that an OFDM symbol of the interference generating feedback signal overlaps within a margin of a length of the CP with an OFDM symbol of the received OFDM signal, and interference generating feedback signal is delayed with the determined delay. Furthermore may the duration of the impulse be shortened as well.

24 Claims, 10 Drawing Sheets

METHOD AND ARRANGEMENT FOR SELF INTERFERENCE CANCELLATION

TECHNICAL FIELD

The present invention relates to a method and an arrangement for self interference cancellation, and in particular to self interference cancellation in relays.

BACKGROUND

3GPP Long Term Evolution (LTE) is a project within the $3^{rd}$ Generation Partnership Project (3GPP) to improve the UMTS standard with e.g. increased capacity and higher data rates towards the fourth generation of mobile telecommunication networks. Hence, the LTE specifications provide downlink peak rates up to 300 Mbps, an uplink of up to 75 Mbit/s and radio access network round-trip times of less than 10 ms. In addition, LTE supports scalable carrier bandwidths from 20 MHz down to 1.4 MHz and supports both FDD (Frequency Division Duplex) and TDD (Time Division Duplex).

LTE uses OFDM (Orthogonal Frequency Division Multiplex) for the downlink, wherein several subcarriers are used instead of one carrier. In the time domain there is a radio frame that is 10 ms long and consists of 10 subframes of 1 ms each. Every subframe consists of two slots where each slot is 0.5 ms. The subcarrier spacing in the frequency domain is 15 kHz. 12 of these subcarriers (per slot) is called a resource block.

LTE-Advanced implies further improvements of the LTE systems where one of the most important improvement areas in LTE-Advanced is the increase of data rates available for users at the cell edge. A promising technique to achieve this goal is the deployment of relays. However, the use of relays implies that the signal processing of the relays are affected by an interference referred to as self interference.

FIG. 1, which is further explained below, discloses a relay structure with self Interference cancellation (SelfIC). The relay structure is an equivalent complex baseband structure, i.e. any radio-related functionality is excluded in this description. Each of the blocks (r, $w_1$, a, $w_2$, t, $b_c$, $b_1$) implements a filter and in case of a MIMO enabled relay even matrix of filters, as disclosed in FIG. 2 for a 2×2 MIMO configuration. In case that there is no coupling between the different MIMO paths the diagonal elements $h_{12}(n)$ and $h_{21}(n)$ vanish. In case of a SISO element only $h_{11}(n)$ remains and is denoted simply h(n).

Mathematically the entity of FIG. 2 can be described by the matrix $$h(n) = \begin{pmatrix} h_{11}(n) & h_{12}(n) \\ h_{21}(n) & h_{22}(n) \end{pmatrix}, \quad (1)$$

which elements contain impulse responses of the different paths. The output-input relation of this entity can be described as $$y(n) = \quad (2)$$
$$\{h*x\}(n) = \begin{pmatrix} h_{11} & h_{12} \\ h_{21} & h_{22} \end{pmatrix} * \begin{pmatrix} x_1 \\ x_2 \end{pmatrix}(n) = \begin{pmatrix} \{h_{11}*x_1\}(n) + \{h_{12}*x_2\}(n) \\ \{h_{21}*x_1\}(n) + \{h_{22}*x_2\}(n) \end{pmatrix}.$$

In the following the functionality of each entity in FIG. 1 will be described. x(n) is the signal entering the relay and y(n) is the output signal of the relay. Depending on the antenna setup of the relay x(n) and y(n) are either scalars or vectors.

The block r(n) 102 describes any non-ideal behavior that the signal is subjected to when entering the relay, e.g. antenna coupling, radio frequency imperfections, imperfect analog digital converter, etc.

The block t(n) 106 describes similar effects at the output of the relay. Furthermore, t(n) 106 absorbs any analogue amplification functionality. These two blocks vanish in the ideal case, i.e. r(n)=t(n)=δ(n), with δ(n) denoting the Kronecker delta function. (δ(n) is 1 for n=0 and 0 otherwise). For 2×2 MIMO relays this implies $r_{11}(n)=r_{22}(n)=t_{11}(n)=t_{22}(n)=\delta(n)$ and $r_{12}(n)=r_{21}(n)=t_{12}(n)=t_{21}=0$.

The block $w_1(n)$ 103 describes matched filtering—in case of a SISO relay—or receiver beamforming for MIMO relays. In the latter case the filter $w_1(n)$ 103 is replaced by a matrix of filters according to FIG. 2. Depending on the actual impulse response(s) of $w_1(n)$ 103 other functions can be implemented as well.

The block $w_2(n)$ 105 describes accordingly transmitter beamforming or other desired signal processing applied to the relay output signal.

The core-relay functions will be performed in block a(n) 104. In case of SISO this function is either a(n)=δ(n) in which case a non-frequency selective relay is described or a(n) is the impulse response of a more general filter, in which case a(n) 104 describes a frequency-selective relay. For higher layer relays a(n) 104 can even include decoding and re-encoding functionality.

In case of MIMO the block a(n) 104 is replaced by a matrix of signal processing functions.

The undesired self interference is described by block $b_1(n)$ 108 and also here $b_1(n)$ 108 is either described by a single filter or by a matrix of filters. Since interference occurs between the transmit antenna output and the receive antenna input the interference path originates after t(n) 108 and terminates before r(n) 102. The entity $b_1(n)$ 108 is actually a complex baseband representation, i.e. effects of modulation and demodulation are included in $b_1(n)$.

In order to mitigate this interference a Self Interference Canceller (SelfIC) $b_C(n)$ 107 is used. In the ideal case—when the interference canceller is able to completely cancel the interference—only the forward signal path r(n)→$w_1(n)$→a (n)→$w_2(n)$→t(n) remains. Please note that for the interference canceller to work a delay larger than 0 is needed in the loop $w_1(n)$→a(n)→$w_2(n)$→$b_C(n)$.

By slightly redrawing the block diagram of FIG. 1, essentially the interference feedback is moved inside r(n) and t(n) and the effect of these entities is considered by modifying the feedback function $b_1(n)$ 108 to $\{t*b*_cr\}(n)$ 108' which is illustrated in FIG. 3. It is important to note that this block diagram is equivalent to the block diagram shown in FIG. 1.

In Orthogonal Frequency Division Multiplex (OFDM) the serial data stream is converted into N parallel data streams and each of these data streams—which have now an N-times lower symbol rate—is used to modulate sinusoidal carriers. Each of the individual sinusoidal carriers is called a subcarrier.

The modulation with sinusoidal carriers can be very efficiently implemented in the frequency domain by a Discrete Fourier Transform (DFT). If the data to be transmitted are collected in the frequency-domain vector X the transmitted time-domain signal becomes $$x(n)=idft\{X\}(n). \quad (3)$$

If this signal is transmitted across a channel h(n) that performs a circular convolution the output signal in frequency domain becomes $$Y(k)=H(k)\cdot X(k), \quad (4)$$

with H(k) being the N-point DFT of h(n) evaluated at subcarrier k. As it can be seen, the data received on subcarrier k only depends on the data transmitted on subcarrier k which makes the receiver implementation very simple. The circular convolution between an input signal and a channel is the linear convolution between the channel and the periodic extension of the original input signal.

However, a physical radio channel does not perform a circular convolution but instead a linear convolution on its input signal due to the fact that the input signal is not periodic. In order to transform this linear convolution performed by the channel into a circular convolution—at least within a certain time frame—(i.e. to make the filter believe that it works on a periodic signal) each OFDM symbol is prefixed by a Cyclic Prefix (CP) in order to make the signal appear periodic over certain time frame, wherein the CP is a copy of the last part of the OFDM symbol. After the complete memory of the channel is excited with the first part of the input signal, the input signal appears periodic to the channel and the linear convolution becomes identical to the circular convolution. In an OFDM system that deploys a CP the output signal therefore becomes the circular convolution after the complete channel memory has been excited by the first part of the input signal.

FIG. 4 depicts this graphically. From time −P+Lh−1 and onwards up to N−1 the output signal y(n) is the circular convolution between h(n) and x(n). Applying an N-point DFT to any N consecutive samples y(n) starting between −P+Lh−1 and 0 yields H(k)·X(k)·P(k), with P(k) being a linear phase that stems from a starting position of the DFT window not equal to zero. Depending on the length of the channel impulse response relative to the CP length multiple position exist all yielding H(k)·X(k)·P(k), to be more specific P−Lh+2 such positions exist. In case the impulse response is longer than the cyclic prefix no such position exists, i.e. the liner convolution performed by the channel will never be equal to the circular convolution. The relationship H(k)·X(k)·P(k) for the frequency-domain representation of the convolution is no longer valid and data transmitted on one subcarrier interfere with data received on another subcarrier.

SUMMARY

Due to the fact that the number of positions yielding H(k)·X(k)·P(k) is limited in combination with the fact that the delay of the feedback signal is unspecified and possibly longer/not aligned with the received signal interference from one subcarrier leaks also to other subcarriers, it is difficult to predict the effect of self interference which is further explained by FIG. 5.

FIG. 5 shows the timing relation between the signal $x_1(n)$—i.e. the desired signal entering the relay after r(n)—and the interference generating feedback signal 110 passed once through the loop $w_1(n) \rightarrow a(n) \rightarrow w_2(n) \rightarrow b(n)$. (b(n) is the combined interference and SelfIC path). It is assumed that the SelfIC circuitry (such as block $b_c(n)$ 107 of FIG. 1) efficiently removes the interference after one pass so that residual interference can be treated as noise. The shaded areas at the beginning of the CP indicate those parts of the signal which are consumed by the delay spread of the channel.

The input signal $x1(n)$ and the interference generating feedback signal are completely misaligned at certain loop delays $w_1(n) \rightarrow a(n) \rightarrow w_2(n) \rightarrow b(n)$ of the interference generating feedback signal. In FIG. 5, one complete OFDM symbol period of $x_1(n)$ partly overlaps with residual interference of previous OFDM symbols and partly with residual interference of the current OFDM symbol. Therefore it is not possible to find a DFT window of length N where both the interference generating feedback signal and $x1(n)$ appears periodic. Depending on the position of the time window either $x1(n)$ or the interference generating feedback signal is described by the linear convolution and interference from one subcarrier leaks also to other subcarriers. This makes it difficult to predict the effect of self interference.

Above described misalignments between $x_1(n)$ and the residual interference also implies that all filtering operations have to be performed in time-domain (the fast convolution algorithms are also being referred to as time-domain algorithms) which is typically costly.

If the loop delay and effective channel impulse response of $w_1(n) \rightarrow a(n) \rightarrow w_2(n) \rightarrow b(n)$ is constrained to be only a fraction of the CP the OFDM symbol periods of both the interfering signal and the signal $x_1(n)$ completely overlap. Because of this complete overlap, the interfering signal appears periodic in the same time window as $x_1(n)$ and interference created by one subcarrier does not spread but only impacts the same subcarrier in the received signal making it easier to predict the self interference.

Alternatively the loop delay may be increased so that OFDM symbol boundaries are aligned but with another OFDM symbol. Furthermore it is possible to shorten the duration of the impulse response experienced by an interfering generating unit by including dedicated signal processing functionality into any of the blocks r(n), $w_1(n)$, a(n), $w_2(n)$, or t(n). Alternatively a separate block dedicated to shorten the impulse response duration may be included in the forward path. Duration refers here to the part of the impulse response that in non-zero (or above a certain threshold).

Thus the embodiments of the present invention relates to idea to constrain the loop delay to a fraction of the CP. The loop delay is constrained to a fraction of the CP for a corresponding OFDM symbol or for a subsequent OFDM symbol. In the second case, the delay in the forward path $w_1(n) \rightarrow a(n) \rightarrow w_2(n)$ is intentionally increased in order to time-align, within a fraction of the CP, the OFDM symbol boundaries of the feedback signal via loop $w_1(n) \rightarrow a(n) \rightarrow w_2(n) \rightarrow b(n)$ with newly received OFDM symbols $x_1(n)$. The delay can also be included in the entities r(n) or t(n); in this case a corresponding delay has to included into the feedback cancellation loop $b_c(n)$.

According to a first aspect of the present invention a method in a relay for receiving an OFDM signal and forwarding the received OFDM signal comprising OFDM symbols of a wireless OFDM communication network is provided. The wireless OFDM communication network includes self-interference cancelling functionality and each received OFDM symbol to be forwarded is prefixed with a cyclic prefix (CP) which is a copy of the last part of the OFDM symbol. In the method a delay for delaying an interference generating feedback signal is determined such that an OFDM symbol of the interference generating feedback signal overlaps within a margin of a length of the CP with an OFDM symbol of the received OFDM signal, and interference generating feedback signal is delayed with the determined delay. Furthermore may the duration of the impulse be shortened as well.

According to a second aspect of the present invention a relay for receiving an OFDM signal and forwarding the received OFDM signal comprising OFDM symbols of a wireless OFDM communication network is provided. The wireless OFDM communication network includes self-interference canceling functionality, and each received OFDM symbol is prefixed with a cyclic prefix, CP, being a copy of the last part of the OFDM symbol. The relay 800 comprises a processing unit 803 for determining a delay for delaying an interference generating feedback signal such that an OFDM symbol of the interference generating feedback signal overlaps within a margin of a length of the CP with an OFDM symbol of the received OFDM signal. The relay 800 comprises further a delayer 808 for delaying the interference generating feedback signal with the determined delay. The processing unit may further determine the signal processing function required to shorten the impulse response the interference generating feedback signal experiences. The delayer would in this case not be a pure delayer but perform the shortening function as well. Alternatively may separate entities be foreseen to execute these functions.

Advantages of the embodiments of the present invention are that the self interference is easier to predict since the interference is not spread across subcarriers. Further, if the delays of the relay follow the structure of the embodiments of the present invention, the self interference cancellation structure can be implemented in the frequency domain which is typically more efficient than in time-domain.

DETAILED DESCRIPTION

Figure 1:
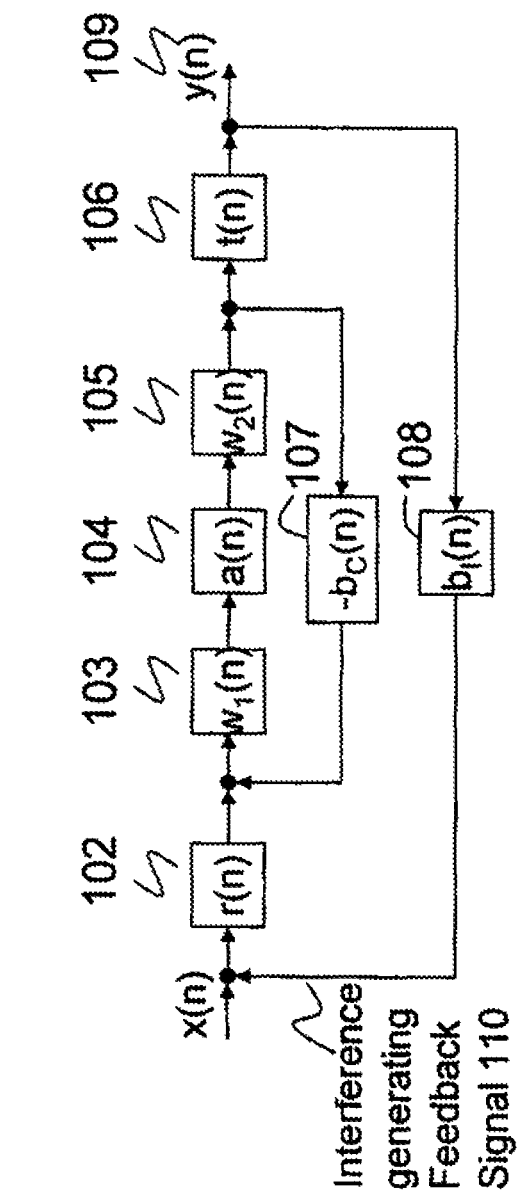
FIG. 1 illustrates a relay structure with self interference cancellation according to prior art.
Figure 2:
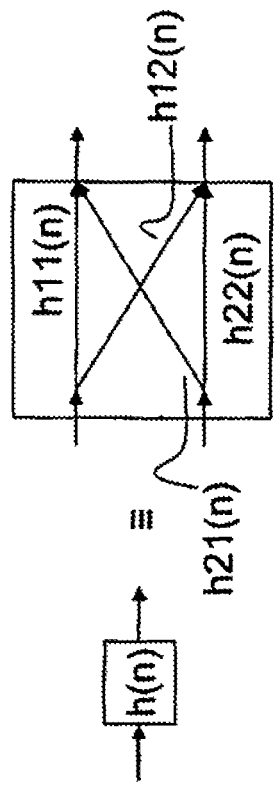
FIG. 2 shows a matrix filter mathematically described according to prior art.
Figure 3:
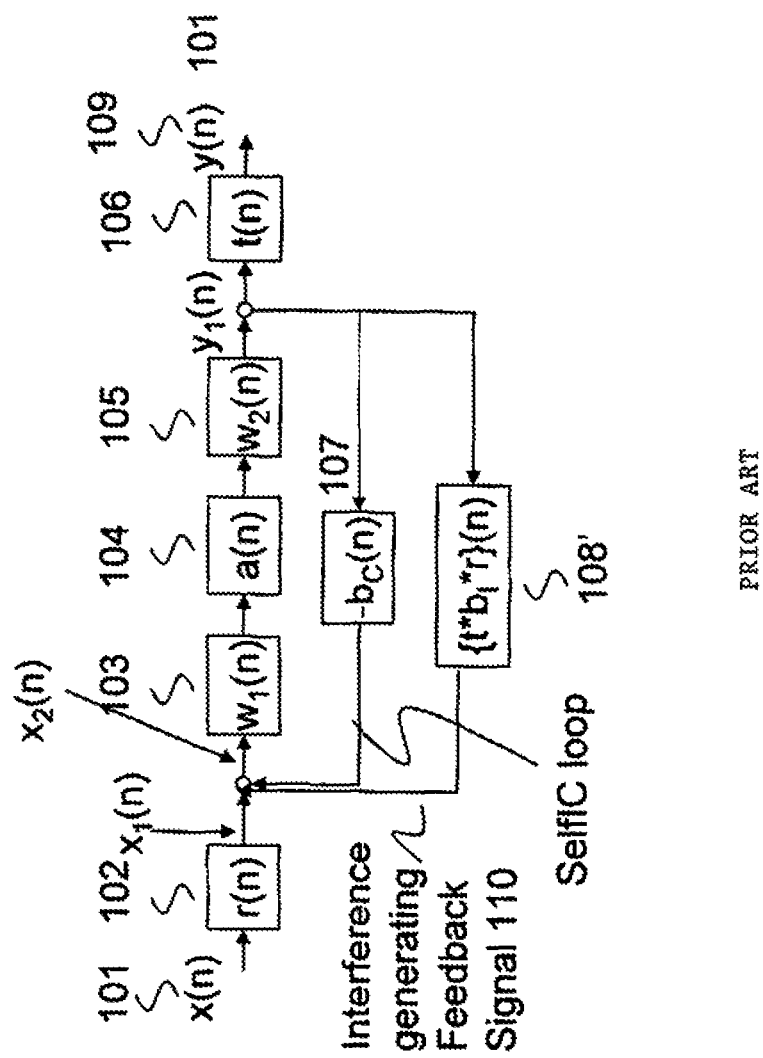
FIG. 3 illustrates another version of the relay structure of FIG. 1.
Figure 4:
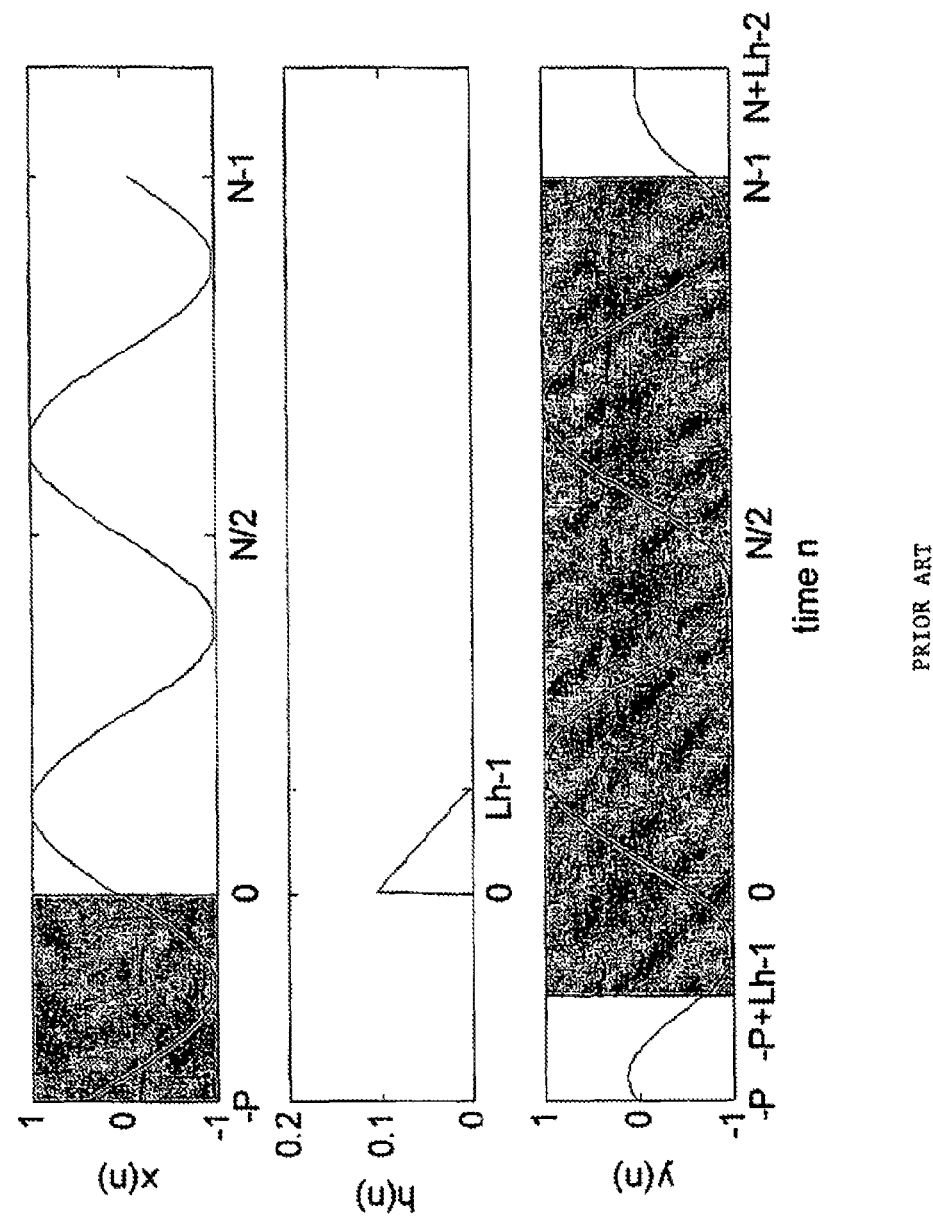
FIG. 4 depicts the input signal, output signal and the radio channel graphically.
Figure 5:
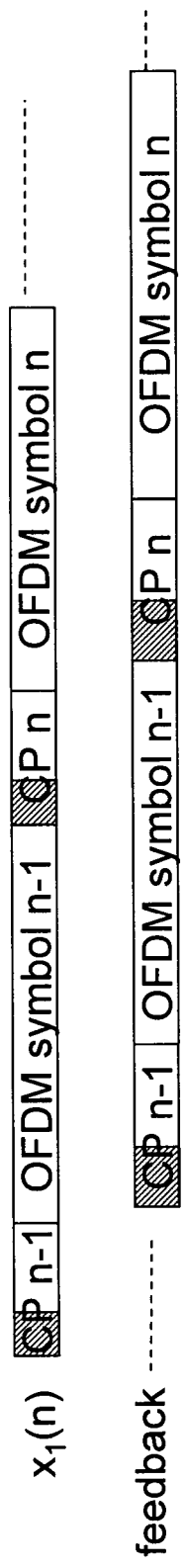
FIG. 5 shows the timing relationship between the input signal and the interference generating feedback signal.

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

Figure 6:
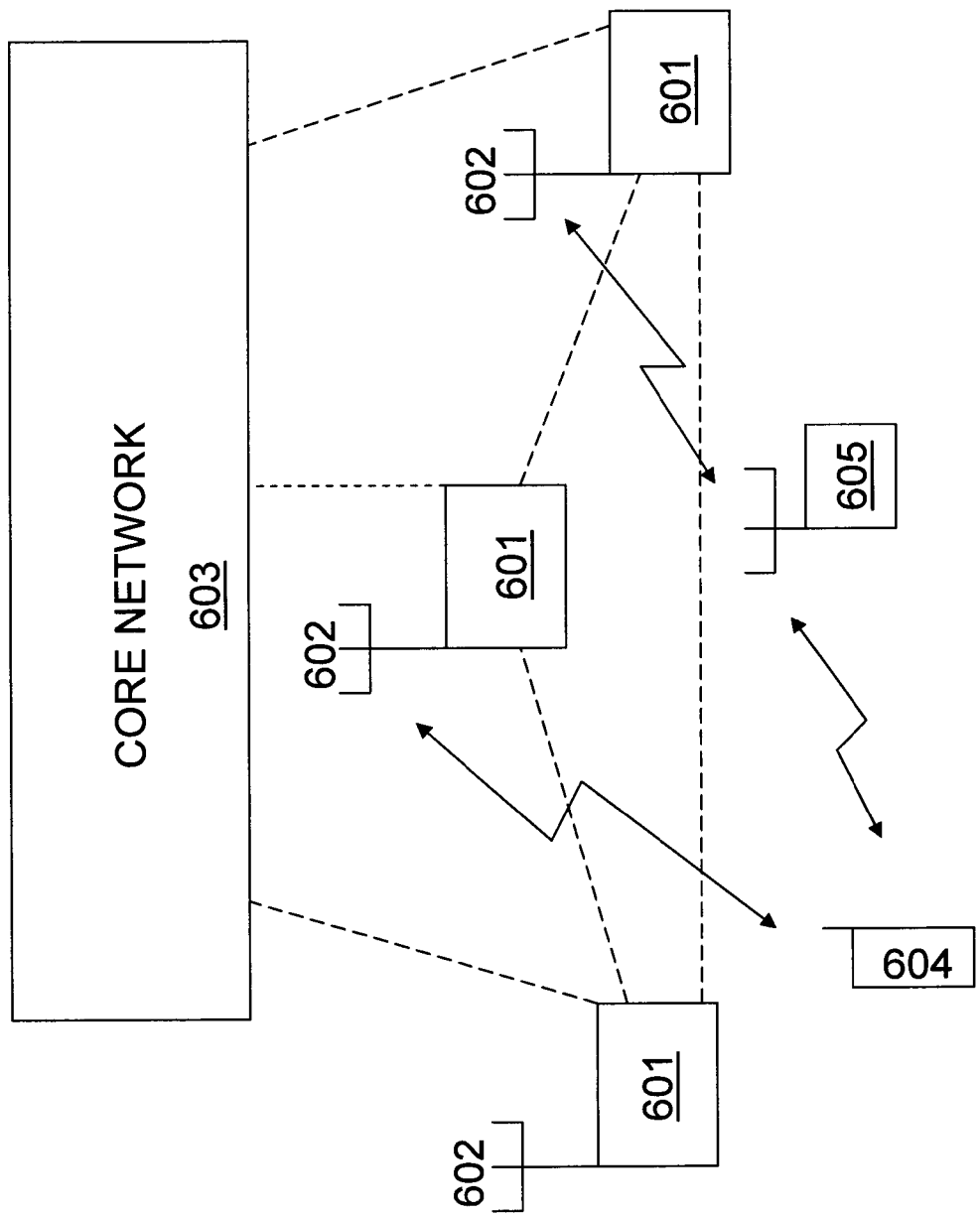
FIG. 6 shows a network wherein the embodiments of the present invention may be implemented.

FIG. 6 illustrates a Long Term Evolution (LTE) network 600 wherein the embodiments of the present invention may be implemented. Radio base stations 601 referred to as eNode Bs are connected to a core network 603 and are also interconnected. Each eNode B 601 has an antenna 602 comprising a plurality of antenna ports. In order to achieve enhanced coverage, relays 605 may be deployed to forward radio signals between one eNodeB and User Equipments (UE). The eNode Bs communicate wirelessly with user equipments 604, directly or via the relay 605. The present invention is directed to the relay 605 and to a method for the relay 605.

Although the embodiments of the present invention are described in the context of a mobile communication network based on the LTE (Long Term Evolution) standard, the present invention is lot limited to LTE but can also be used in other networks with OFDM based signaling that deploy relays.

As stated above, in order to make it easier to predict the effect of self interference, the embodiments of the present invention relates to idea to constrain the loop delay to a fraction of the length of the cyclic prefix (CP). According to a first embodiment, the loop delay is constrained to a fraction of the CP for a corresponding OFDM symbol and according to a second embodiment the loop delay is constrained to a fraction of the CP for a subsequent OFDM symbol. In the second embodiment, the delay in the forward path $w_1(n) \to a(n) \to w_2(n)$ is intentionally increased in order to time-align, within a fraction of the CP, the OFDM symbol boundaries of the feedback signal via loop $w_1(n) \to a(n) \to w_2(n) \to b(n)$ with newly received OFDM symbols $x(n)$. The delay can also be included in the entities $r(n)$ or $t(n)$; in this case a corresponding delay has to included into the feedback cancellation loop $b_C(n)$.

Optionally the impulse response experienced by the interference generating feedback signal can be shortened.

Figure 7A:
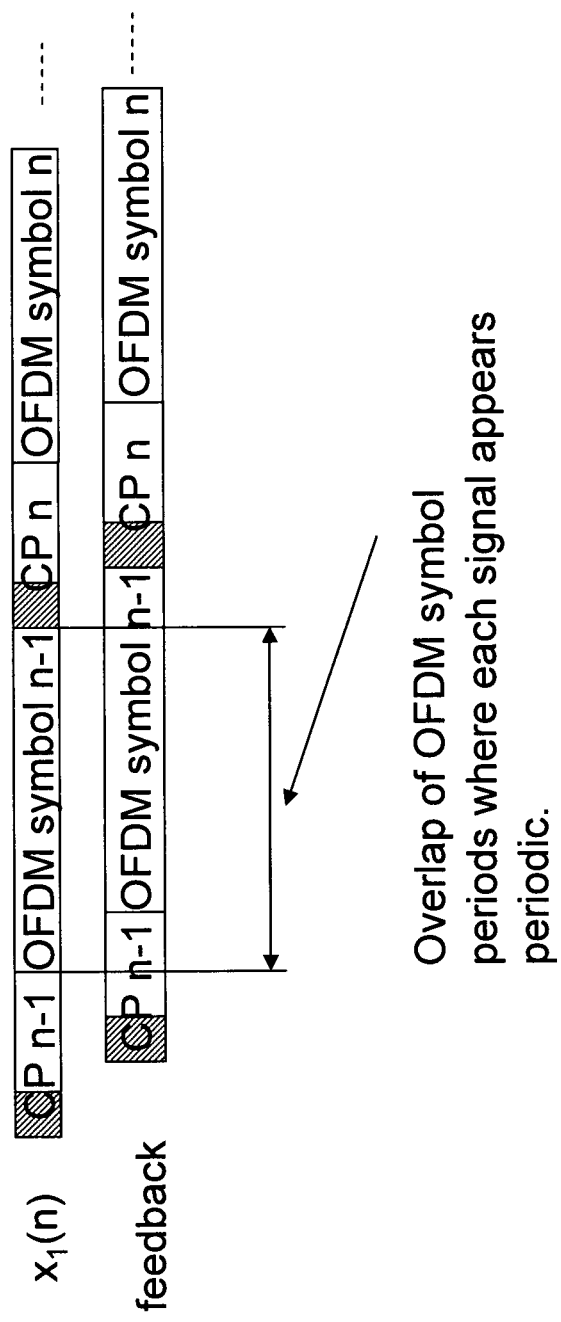
FIGS. 7a and 7b illustrates the signal misalignment between $x_1(n)$ and the interference generating feedback signal if the loop delay and effective channel impulse response is just a fraction of the CP.
Figure 7B:
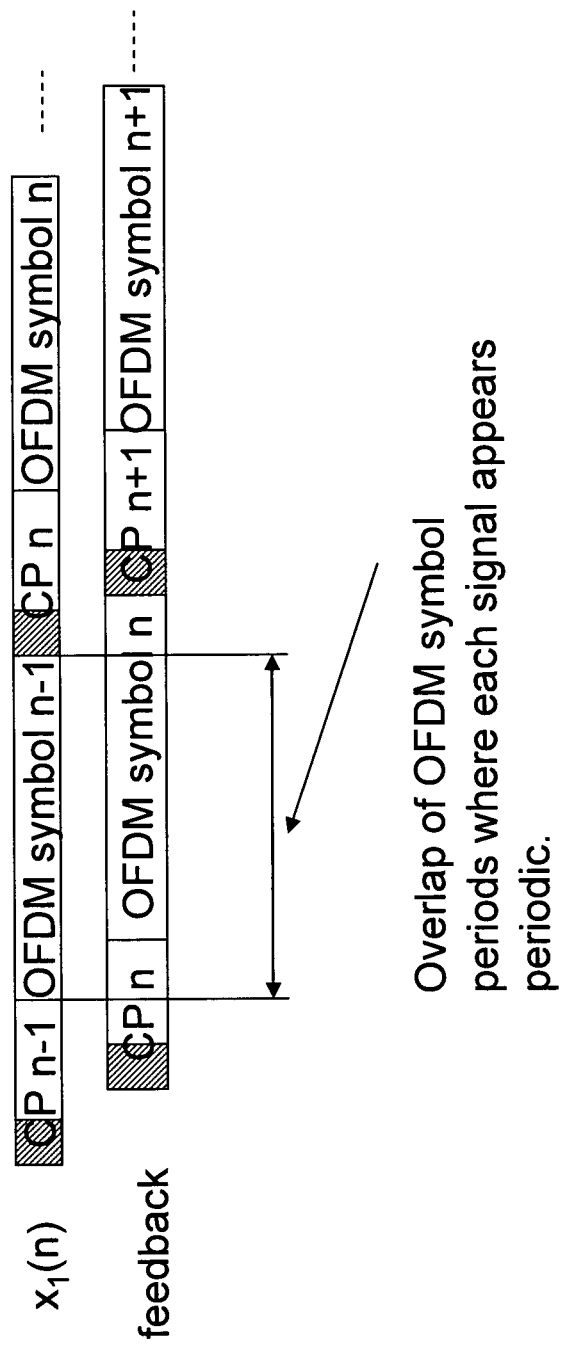

Turning now to FIGS. 7a and 7b, illustrating the time-alignment between $x_1(n)$ and the interfering signal under the assumption that loop delay and effective channel impulse response $w_1(n) \to a(n) \to w_2(n) \to b(n)$ is delayed a fraction of the CP. FIG. 7a illustrates the scenario when the loop delay is constrained to a fraction of the CP for a corresponding OFDM symbol. In this case one complete OFDM symbol period of $x_1(n)$ overlaps with a complete OFDM symbol period of the feedback signal also referred to as interference generating feedback signal. I.e., the indicated time duration is the latest time period where both the input signal $x_1(n)$ and the interference generating feedback signal appear periodic within. The earliest position wherein both the input signal $x_1(n)$ and the interference generating feedback signal appear periodic would be after all transients decayed in the feedback signal (end of shaded area in CP). It should be noted that in the shaded areas of FIGS. 7a and 7b signal transients from the OFDM symbol boundaries are still present while the non-shaded area depicts the signal duration in which the signal is periodic, i.e. all transients already decayed. Because of the periodic nature of the signals within these periods it is possible to use the DFT to describe the signal relation at the input of block $W_1$:

$$X_2(k) = X_1(k) + (R(k) \cdot B_1(k) \cdot T(k) - B_C(k)) \cdot Y_1(k) \quad (5)$$

From (5), it can be seen that the subcarrier k is only impacted by interference stemming from subcarrier k of the output signal. This interference is not spread across subcarriers.

According to the second embodiment illustrated in FIG. 7b, the loop delay is constrained to a fraction of the CP for a subsequent OFDM symbol. That implies that the loop delay is increased so that the interference generating signal is aligned within a fraction of the useable CP with subsequent OFDM symbols of the input stream.

Figure 8:
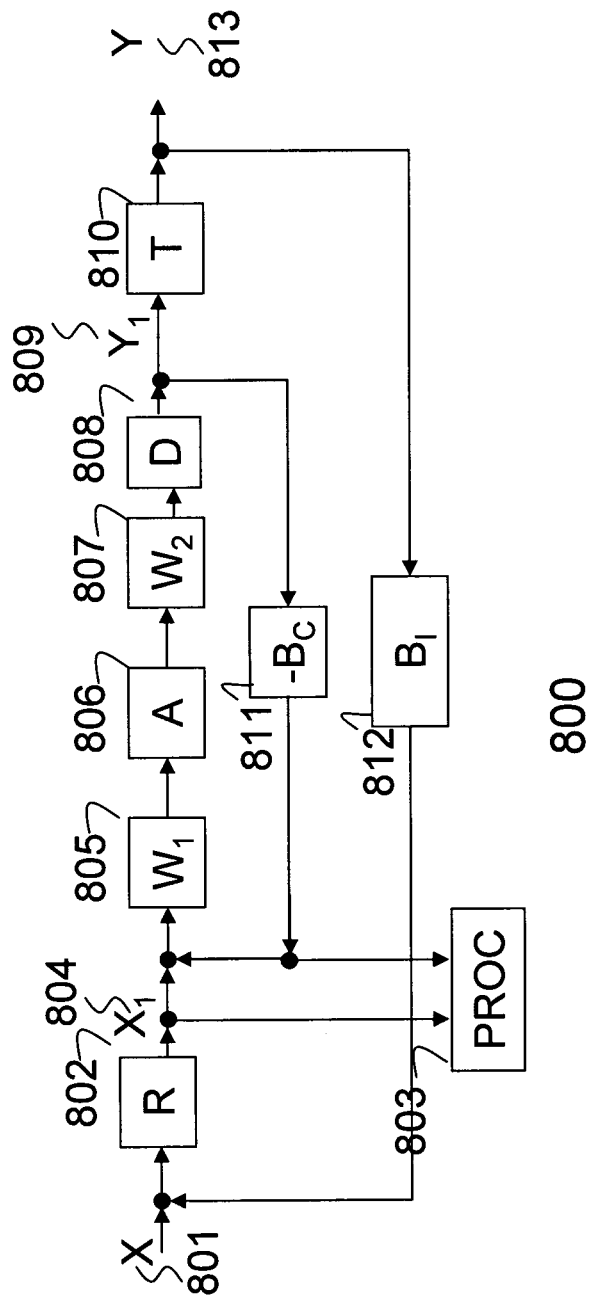
FIG. 8 illustrates a relay structure according to embodiments of the present invention.
Figure 10:
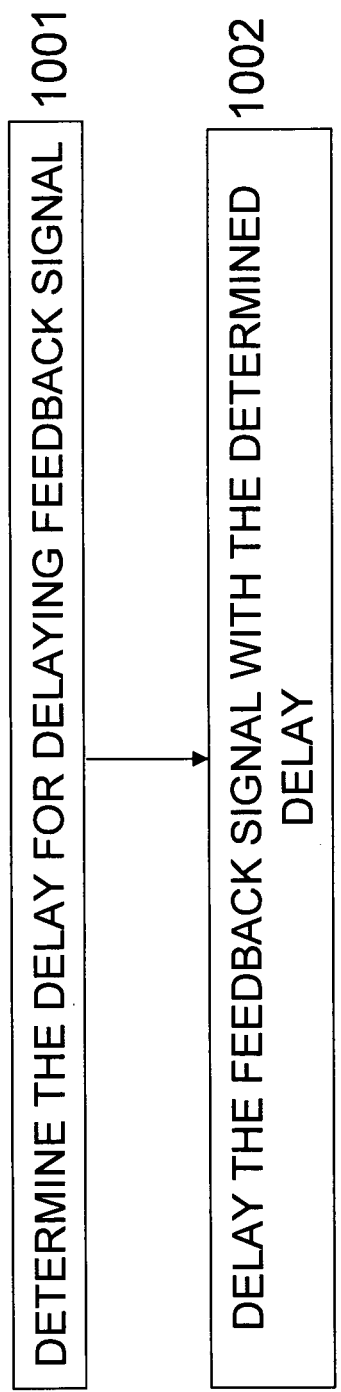
FIG. 10 is a flowchart of the method according to embodiments of the present invention.

To summarize, a method in a relay for receiving an OFDM signal and forwarding the received OFDM signal comprising OFDM symbols of a wireless OFDM communication network including self-interference cancelling functionality is provided. Each received OFDM symbol to be forwarded is prefixed with a CP being a copy of the last part of the OFDM symbol. As illustrated in the flowchart of FIG. 10, the method comprises the steps of:

1001. Determine a delay for delaying an interference generating feedback signal such that an OFDM symbol of the interference generating feedback signal overlaps within a margin of a length of the CP with an OFDM symbol of the received OFDM signal. Optionally this step also determines the signal processing function required to shorten the impulse response experienced by the interference generating feedback signal. The delay is determined by a processing unit 803 in the relay 800 as illustrated in FIG. 8.

1002. Delay the interference generating feedback signal with the determined delay. Optionally this step also includes execution of the signal processing function to shorten the impulse response. The delay is achieved by a delayer 808 of the relay 800 as illustrated in FIG. 8.

According to the first embodiment where the loop delay is constrained to a fraction of the CP for a corresponding OFDM symbol, the determining step further comprises the step of determining the delay for delaying the interference generating feedback signal such that an OFDM symbol of the interference generating feedback signal overlaps within a margin of a length of the CP with the corresponding OFDM symbol of the received OFDM signal by restricting the loop delay of the interference generating feedback signal to a fraction of the length of the CP.

According to the second embodiment where the loop delay is constrained to a fraction of the CP for a subsequent OFDM symbol, the determining step comprises determining the delay for delaying the interference generating feedback signal such that an OFDM symbol of the interference generating feedback signal overlaps within a margin of a length of the CP with a subsequent OFDM symbol of the received OFDM signal by introducing an additional loop delay of the interference generating feedback signal.

Moreover, the OFDM symbol of the interference generating feedback signal may completely overlap with an OFDM symbol of the received OFDM signal according to the embodiments of the present invention.

FIG. 8 illustrates a relay structure according to the embodiments of the present invention configured to be implemented in the relay 605 exemplified in FIG. 6. FIG. 8 is a block diagram of FIG. 1 where the time-domain description of the individual entities has been replaced by their respective Fourier Transforms with the addition of the processing unit 803 and the additional delayer 808. The delayer may also contain functionality to shorten the impulse response that is experienced by the interference generating feedback signal. Alternatively a separate entity may be foreseen to implement this functionality. The relay 800 receives an OFDM signal 801 and forwards the received OFDM signal 813 which comprises OFDM symbols of a wireless OFDM communication network including self-interference cancelling functionality 811 which may be performed in the frequency domain. As stated above, each received OFDM symbol is prefixed with a CP prefix, being a copy of the last part of the OFDM symbol. The relay 800 comprises the processing unit 803 for determining a delay for delaying an interference generating feedback signal such that an OFDM symbol of the interference generating feedback signal overlaps within a margin of a length of the CP with an OFDM symbol of the received OFDM signal. This processing unit may also determine the required signal processing function to shorten the impulse response that is experienced by the interference generating feedback signal. Alternatively a separate entity may be foreseen to implement this functionality. The processing unit 803 typically calculates the delay by inspecting the impulse response that is experienced by the interference generating feedback signal. One way to obtain the impulse response that is experienced by the interference generating feedback signal is to use relay specific reference signals (not shown). Here the relay 800 transmits reference signals via the transmission antennas and receives the signal via the receive antennas. Assuming that these reference signals are transmitted on resources orthogonal to other signals received via the input antennas or that the processing gain provided by the relay specific reference signals is large enough to sufficiently suppress interference the correlation of the received signal with the transmitted relay specific reference signals is a good estimate of the impulse response that is experienced by the interference generating feedback signal. The delay is then that time where the impulse response that is experienced by the interference generating feedback signal starts to have contributions above a certain threshold. Using this delay the processing unit 803 can now calculate the required delay to align the interference generating feedback signal with the received signal within a margin of a length of the CP. Alternatively or in addition the processing unit 803 can also calculate required signal processing functionality to shorten the effective length of the impulse response that is experienced by the interference generating feedback signal, i.e. the time duration during which the impulse response that is experienced by the interference generating feedback signal has contributions above a certain threshold. For example, in case the delay of the impulse response that is experienced by the interference generating feedback signal is so short that it fits within the cyclic prefix but the effective length of the impulse response that is experienced by the interference generating feedback signal is too long to allow an overlap of periodic parts of received signal and interference generating feedback signal for a duration of an OFDM symbol the processing unit may calculate signal processing functionality that shortens the effective length of impulse response that is experienced by the interference generating feedback signal to enable an overlapping period of an OFDM symbol duration.

Shortening of the impulse response may of course also be needed if the delay is longer than the cyclic prefix. The processing unit 803 calculates a delay to align the interference generating feedback signal with a subsequent OFDM symbol of the received signal within a margin of a length of the CP. In case the effective length of the impulse response that is experienced by the interference generating feedback signal is longer than the cyclic prefix and thus making it impossible to overlap the periodic parts of interference generating feedback signal and received signal over the duration of an OFDM symbol the impulse response that is experienced by the interference generating feedback signal is shortened to enable this overlap.

It may be also be possible that the processing unit 803 jointly calculates required delay to align the interference generating feedback signal with the received signal within a margin of a length of the CP and signal processing functionality to shorten effective impulse response that is experienced by the interference generating feedback signal. This joint calculation may result in better self interference cancellation. The relay 800 comprises further the delayer 808 for delaying the interference generating feedback signal with the determined delay. The delayer 808 may also contain functionality to shorten the impulse response that is experienced by the interference generating feedback signal. Alternatively a separate entity may be foreseen to implement this functionality.

In case of short delay that fits into the cyclic prefix and a short duration of the effective impulse response that is experienced by the interference generating feedback signal (either it is short or shortened by extra shortening functionality) it can be possible to make the same OFDM symbols of received signal and interference generating feedback signal overlap. In case the delay is too long OFDM symbols of the interference generating feedback signal will be aligned with subsequent OFDM symbols of the received signal.

It should be noted that any remaining blocks of FIG. 8 corresponds to the blocks of FIG. 1 where the time-domain description of the individual entities has been replaced by their respective Fourier Transforms.

According to a first embodiment, the processing unit 803 is configured to determine the delay for delaying the interference generating feedback signal such that an OFDM symbol of the interference generating feedback signal overlaps within a margin of a length of the CP with the corresponding OFDM symbol of the received OFDM signal by restricting the loop delay of the interference generating feedback signal to a fraction of the length of the CP.

According to a second embodiment, the processing unit 803 is further configured to determine the delay for delaying the interference generating feedback signal such that an OFDM symbol of the interference generating feedback signal overlaps within a margin of a length of the CP with a subsequent OFDM symbol of the received OFDM signal by introducing an additional loop delay of the interference generating feedback signal.

Moreover, the delayer 808 may either be integrated with a unit for other signal processing or located in a separate unit.

The embodiments of the present invention will be further described by a scheme where the loop delay and effective impulse response is shorter than the CP as explained below.

The overall input-output relation of the relay depicted in FIG. 8 is derived in the following. This analysis is done in the frequency domain by means of the Fourier Transform (not Discrete Fourier Transform) rather than in the time-domain. FIG. 8 shows as stated above the block diagram of FIG. 1 where the time-domain description of the individual entities has been replaced by their respective Fourier Transforms with the addition of the processing unit 803 and the additional delayer 808. (For clarity the dependency of the Fourier Transform $H(\Theta)$ on the angular frequency $\Theta$ is suppressed and this is only denoted by H). In case of MIMO an entity is described by a matrix where the elements are the individual Fourier Transforms. Using this block diagram it is possible to write $$X_1 = RX$$

$$Y_1 = D \cdot W_2 \cdot A \cdot W_1 \cdot X_1 + D \cdot W_2 \cdot A \cdot W_1 \cdot (R \cdot B_1 \cdot T \cdot B_C) \cdot Y_1.$$

$$Y = T \cdot Y_1 \qquad (6)$$

Solving the middle equation for $Y_1$ and also using the first and third equation one obtains $$Y = \frac{T \cdot D \cdot W_2 \cdot A \cdot W_1 \cdot R \cdot X}{1 - D \cdot W_2 \cdot A \cdot W_1 \cdot (R \cdot B_1 \cdot T - B_C)}. \qquad (7)$$

The above equation (7) uses Fourier Transforms and is therefore valid for any relative time (miss)-alignment between $x_1(n)$ and the interference generating feedback signal. This equation (7) describes the overall input-output behavior of the advanced relay but gives not so much insight into alternative implementations since the interference path—which happens automatically—is embedded into that. To derive an alternative structure the part consisting of $D, W_1, A, W_2$ and the interference canceller $B_C$ are extracted and this is expressed by the transfer function G. The function G describes a relay with SelfIC but without self interference. Using the same methodology as above G can be expressed as $$G = \frac{D \cdot W_2 \cdot A \cdot W_1}{1 - D \cdot W_2 \cdot A \cdot W_1 \cdot R \cdot B_C \cdot T}. \qquad (8)$$

Figure 9:
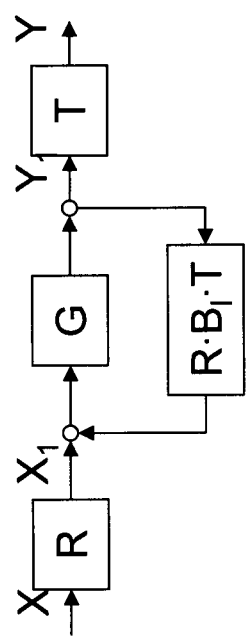
FIG. 9 illustrates a relay structure according to embodiments of the present invention.

Re-drawing block diagram of FIG. 8 where the parts D, $W_1$, A, $W_2$ and $B_C$ are replaced by G leads to the block diagram depicted in FIG. 9. In this structure the interference $B_1$ is the only (obvious) feedback channel. Depending on the feed forward and feedback channel it may be beneficial to not implement the blocks D, $W_1$, A, $W_2$ and $B_C$ separately but calculate operation of the combined block G first and apply its overall operation to the input signal.

For the case that loop delay and effective impulse response fit into the CP Eq. (6) is also valid for DFT and thus also Eq. (7) and Eq. (8) hold for the DFT. Using Eq. (8) and interpreting each variable as DFT rather than continuous Fourier Transform the overall relay function can be calculated in the DFT domain and expressed by the DFT vector G(k). However, since the delay is less than the CP—which typically is much smaller than the OFDM symbol duration—it is impossible to calculate the DFT of the input signal within this time. Therefore an Inverse Discrete Fourier Transform (IDFT) must be applied to G(k) yielding the filter function g(n). Since the effective loop impulse must be shorter than the CP the support of g(n) can typically be restricted to the length of the CP. The overall relay function is now described by the filter function g(n). Other filter design methods to obtain g(n) from G(k) can of course also be envisioned.

It is of course also possible just to combine parts of the relay in DFT domain, e.g. $W_1$, A, and $W_2$ and to obtain via IDFT the time-domain filter describing these three blocks. The self-interference cancellation circuitry would remain as an own filter in this case.

In accordance with the second embodiment, in case the loop delay cannot be made short enough to fulfill the requirements in previous section it is proposed to intentionally increase the delay in the forward path $w_1(n) \to a(n) \to w_2(n) \to d(n)$ in order to time-align within a fraction of the CP the OFDM symbol boundaries of the interference generating feedback signal (via loop $w_1(n) \to a(n) \to w_2(n) \to b(n) \to d(n)$) with newly received OFDM symbols $x_1(n)$.

If the loop delay and effective loop impulse response is such that a complete OFDM symbol period of the input signal $x_1(n)$ overlaps with a complete OFDM symbol period of the feedback signal generated by past OFDM symbols than Eq. (6) holds in DFT domain with small modifications.

$$X_1(n) = RX(n)$$

$$Y_1(n) = D \cdot W_2 \cdot A \cdot W_1 \cdot X_1(n) + D \cdot W_2 \cdot A \cdot W_1 \cdot (R \cdot B_1 \cdot T \cdot B_C) \cdot Y_1(n-n_0)$$

$$Y(n) = T \cdot Y_1(n)$$

The above introduced dependency on index n is OFDM symbol index n. For clarity of notation the frequency domain index k is omitted in above equations, i.e. $X_1(n)$ is actually $X_1(n,k)$, where n is the OFDM symbol index and k is the frequency domain index. Due to the delay the feedback is created by OFDM output symbol $Y_1(n-n_0)$ which was outputted $n_0$ blocks ago.

Due to the large delay it is now possible to perform the whole relay operation in the DFT domain, i.e. the input signal is transformed via a DFT circuitry in DFT domain, is then processed in the DFT domain, and prior transmission transformed back into time-domain via an IDFT circuitry. Due to the aligned OFDM symbols in front of entity $W_1$ this also applies for the interference and the cancellation signal.

Implementing the relay and the self-interference cancellation circuitry in the DFT domain typically leads to a more efficient implementation.

The DFT based self-interference cancellation only removes interference within the duration of one OFDM symbol period. Interference outside the OFDM symbol duration (CP) must—if necessary—be cancelled by a time-domain based self-interference cancellation. However, the CP is only a fraction of the OFDM symbol duration and the time-domain self-interference cancellation must therefore only operate over short time intervals and does therefore not increase overall complexity much.

Even though the embodiments of the present invention are outlined in the context of an OFDM system this invention also applies to precoded OFDM systems. One such example would be DFTS-OFDM (DFT Spread OFDM) or SC-FDMA (Single Carrier-Frequency Division Multiple Access) as applied in the uplink of LTE.

According to another embodiment of the present invention, the relay may be a frequency translating relay. The frequency translating relay moves the spectrum of the received signal from one frequency to another. Thus the main contribution of possible self interference is located at the new frequency where the input signal has no or very little energy.

Combining frequency translating relays with the proposed self interference cancellation schemes is beneficial since here the self interference is totally confined to the subcarrier at the output frequencies, i.e. the self interference is orthogonal to the input signal. The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method in a relay for receiving an OFDM signal and forwarding the received OFDM signal comprising OFDM symbols of a wireless OFDM communication network including self-interference cancelling circuitry, wherein each received OFDM symbol to be forwarded is prefixed with a cyclic prefix, CP, being a copy of a part of the OFDM symbol, comprising the steps of:
   determining a delay for delaying an interference generating feedback signal such that an OFDM symbol of the interference generating feedback signal overlaps within a fraction of a length of the CP with an OFDM symbol of the received OFDM signal, the interference generating feedback signal including one or both of a self-interfering signal or a self-interference cancellation signal, wherein the fraction of the length of the CP is less than a whole length of the CP; and
   delaying the interference generating feedback signal with the determined delay.

2. The method according to claim 1, wherein the determining step further comprises:
   determining the delay for delaying the interference generating feedback signal such that an OFDM symbol of the interference generating feedback signal overlaps within a fraction of a length of the CP with the corresponding OFDM symbol of the received OFDM signal by restricting the delay of the interference generating feedback signal to a fraction of the length of the CP.

3. The method according to claim wherein the delaying step further comprises:
   determining the delay for delaying the interference generating feedback signal such that an OFDM symbol of the interference generating feedback signal overlaps within a fraction of a length of the CP with a subsequent OFDM symbol of the received OFDM signal by introducing an additional delay of the interference generating feedback signal.

4. The method according to claim 1, wherein the OFDM symbol of the interference generating feedback signal completely overlaps with an OFDM symbol of the received OFDM signal.

5. The method according to claim 1, wherein the delay is introduced by a delayer integrated with a unit for other signal processing.

6. The method according to claim 1, wherein the delay is introduced by a delayer in a separate unit.

7. The method according to claim 1, wherein impulse response experienced by the interference generating feedback signal in any of the blocks in the signal path is shortened by a shortening function.

8. The method according to claim 7, wherein the shortening function is integrated with a unit for other signal processing.

9. The method according to claim 7, wherein the shortening function is introduced by a signal processing function in a separate unit.

10. The method according to claim 1, wherein the self-interference cancellation is performed in frequency-domain.

11. The method according to claim wherein the relay is a frequency-translating relay.

12. The method according to claim 1, wherein the OFDM communication network is a precoded OFDM communication network.

13. A relay for receiving an OFDM signal and forwarding the received OFDM signal comprising OFDM symbols of a wireless OFDM communication network including self-interference cancellation circuitry, wherein each received OFDM symbol is prefixed with a cyclic prefix, CP, being a copy of a part of the OFDM symbol, the relay comprising:
   a processing unit configured to determine a delay for delaying an interference generating feedback signal such that an OFDM symbol of the interference generating feedback signal overlaps within a fraction of a length of the CP with an OFDM symbol of the received OFDM signal, the interference generating feedback signal including one or both of self-interfering signal or a self-interference cancellation signal, wherein the fraction of the length of the CP is less than a whole length of the CP; and
   a delayer configured to delay the interference generating feedback signal with the determined delay.

14. The relay according to claim 13, wherein the processing unit is further configured to determine the delay for delaying the interference generating feedback signal such that an OFDM symbol of the interference generating feedback signal overlaps within a fraction of a length of the CP with the corresponding OFDM symbol of the received OFDM signal by restricting the delay of the interference generating feedback signal to a fraction of the length of the CP.

15. The relay according to claim 13, wherein the processing unit is further configured to determine the delay for delaying the interference generating feedback signal such that an OFDM symbol of the interference generating feedback signal overlaps within a fraction of a length of the CP with a subsequent OFDM symbol of the received OFDM signal by introducing an additional delay of the interference generating feedback signal.

16. The relay according to claim 13, wherein the OFDM symbol of the interference generating feedback signal completely overlaps with an OFDM symbol of the received OFDM signal.

17. The relay according to claim 13, wherein the delayer is integrated with a unit for other signal processing.

18. The relay according to claim 13, wherein the delayer is a separate unit.

19. The relay according to claim 13, wherein the relay is configured to implement a shortening function that shortens an impulse response experienced by the interference generating feedback signal.

20. The relay according to claim 19, wherein the shortening function is integrated with a unit for other signal processing.

21. The relay according to claim 19, wherein the shortening function is introduced by a signal processing function in a separate unit.

22. The relay according to claim 13, wherein the relay is configured to perform self-interference cancellation in a frequency-domain.

23. The relay according to claim 13, wherein the relay is a frequency-translating relay.

24. The relay according to claim 13, wherein the OFDM communication network is a precoded OFDM communication network.

* * * * *

UNITED STATES PATENT AND TRADEMARK OFFICE
CERTIFICATE OF CORRECTION

PATENT NO. : 8,837,615 B2  
APPLICATION NO. : 13/505700  
DATED : September 16, 2014  
INVENTOR(S) : Baldemair Page 1 of 2

It is certified that error appears in the above-identified patent and that said Letters Patent is hereby corrected as shown below:

In the Drawings:

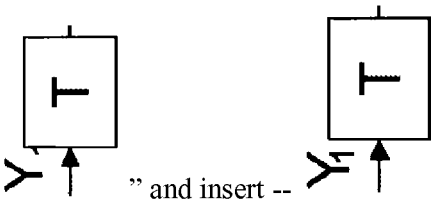

In Fig. 9, Sheet 9 of 10, delete " " and insert -- --, therefor.

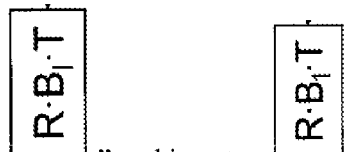

In Fig. 9, Sheet 9 of 10, delete " " and insert -- --, therefor.

In the Specification:

In Column 2, Line 13, delete "$t_{21}=0.$" and insert -- $t_{21}(n)=0.$ --, therefor.

In Column 3, Line 65, delete "x1(n)" and insert -- $x_1(n)$ --, therefor.

In Column 4, Line 6, delete "x1(n)" and insert -- $x_1(n)$ --, therefor.

In Column 4, Line 7, delete "x1(n)" and insert -- $x_1(n)$ --, therefor.

In Column 4, Line 46, delete "has to included" and insert -- has to include --, therefor.

In Column 5, Line 39, delete "illustrates" and insert -- illustrate --, therefor.

In Column 6, Line 22, delete "is lot" and insert -- is not --, therefor.

Signed and Sealed this  
Tenth Day of November, 2015

Michelle K. Lee  
*Director of the United States Patent and Trademark Office*

CERTIFICATE OF CORRECTION (continued)
U.S. Pat. No. 8,837,615 B2

In the Specification:

In Column 6, Line 39, delete "has to included" and insert -- has to include --, therefor.

In Column 9, Line 63, in Equation "(6)", delete "T.$B_C$).$Y_1$." and insert -- T-$B_C$).$Y_1$. --, therefor.

In Column 11, Line 1, delete "T.$B_C$).$Y_1$" and insert -- T-$B_C$).$Y_1$ --, therefor.

In the Claims:

In Column 12, Line 14, in Claim 3, delete "claim wherein" and insert -- claim 1, wherein --, therefor.

In Column 12, Line 32, in Claim 7, delete "wherein impulse" and insert -- wherein a channel impulse --, therefor.

In Column 12, Line 43, in Claim 11, delete "claim wherein" and insert -- claim 1, wherein --, therefor.